United States Patent
Takeshi et al.

(10) Patent No.: US 9,320,107 B2
(45) Date of Patent: Apr. 19, 2016

(54) VEHICULAR LAMP

(71) Applicant: KOITO MANUFACTURING CO., LTD., Tokyo (JP)

(72) Inventors: Toda Takeshi, Shizuoka (JP); Takao Muramatsu, Shizuoka (JP); Tsuchiya Toshiyuki, Shizuoka (JP); Masayasu Ito, Shizuoka (JP)

(73) Assignee: KOITO MANUFACTURING CO., LTD., Minato-ku, Tokyo ( * ) Notice: Subject to any disclaimer, the term of this patent is extended or adjusted under 35 U.S.C. 154(b) by 0 days.

(21) Appl. No.: 14/559,049

(22) Filed: Dec. 3, 2014

(65) Prior Publication Data

US 2015/0163871 A1    Jun. 11, 2015

(30) Foreign Application Priority Data

Dec. 6, 2013  (JP) .................................. 2013-252847

(51) Int. Cl.
| | | |
|---|---|---|
| H05B 37/02 | (2006.01) | |
| H05B 33/08 | (2006.01) | |
| B60Q 11/00 | (2006.01) | |

(52) U.S. Cl.
CPC .............. *H05B 33/089* (2013.01); *B60Q 11/00* (2013.01); *H05B 33/083* (2013.01)

(58) Field of Classification Search
CPC .......................... H05B 33/083; H05B 33/0848
USPC ................. 315/82, 285 R, 294, 307
See application file for complete search history.

(56) References Cited

U.S. PATENT DOCUMENTS

| | | | | |
|---|---|---|---|---|
| 7,710,050 | B2* | 5/2010 | Preston et al. ................ | 315/312 |
| 2007/0132602 | A1* | 6/2007 | Ito et al. ........................ | 340/641 |
| 2011/0148306 | A1* | 6/2011 | Ger et al. ...................... | 315/125 |
| 2012/0025713 | A1* | 2/2012 | Ribarich et al. .............. | 315/122 |
| 2013/0200801 | A1* | 8/2013 | Fratti ............................. | 315/122 |
| 2013/0200802 | A1* | 8/2013 | Sakuragi et al. .............. | 315/122 |
| 2014/0265890 | A1* | 9/2014 | Ito et al. ........................ | 315/186 |
| 2015/0173133 | A1* | 6/2015 | Seki et al. ..................... | 315/125 |

FOREIGN PATENT DOCUMENTS

| | | |
|---|---|---|
| JP | 2011192865 | 9/2011 |
| JP | 2013109939 | 6/2013 |

* cited by examiner

*Primary Examiner* — Don Le
(74) *Attorney, Agent, or Firm* — Abelman, Frayne & Schwab

(57) ABSTRACT

The present disclosure provides a vehicular lamp including bypass circuits parallel to light emitting devices to precisely cope with an abnormality of the bypass circuit side. The vehicular lamp includes: one or more bypass units connected in parallel to at least a part of a plurality of light emitting devices to form a bypass route of the emission driving current so that the light emitting device is turned OFF according to a bypass control signal, or to cut off the bypass route; abnormality detecting units configured to generate state signals each of which indicates an normal state or an abnormal state of each of the bypass units; and a control unit configured to control the formation of the bypass route. When the generated state signal indicates that each of the bypass units is abnormal, supply of the emission driving current from the light source power supply is reduced or stopped.

18 Claims, 8 Drawing Sheets

VEHICULAR LAMP

CROSS-REFERENCE TO RELATED APPLICATIONS

This application is based on and claims priority from Japanese Patent Application No. 2013-252847, filed on Dec. 6, 2013, with the Japan Patent Office, the disclosure of which is incorporated herein in its entirety by reference.

TECHNICAL FIELD

The exemplary embodiments of the present disclosure relate to a vehicular lamp which includes a plurality of light emitting devices connected in series.

BACKGROUND

A vehicular lamp, such as, for example, a vehicular headlight employs a light emitting device such as, for example, a light emitting diode (LED) serving as a semiconductor light source, or a light emitting device such as, for example, a filament bulb.

Japanese Patent Laid-Open Publication No. 2013-109939 discloses a technology of detecting an abnormality such as a disconnection, a short-circuit, or a ground fault which may occur in an LED.

Japanese Patent Laid-Open Publication No. 2011-192865 discloses a circuit in which a bypass circuit is provided for each of a plurality of LEDs connected in series so that the LEDs may be turned OFF when the bypass route is turned ON.

SUMMARY

However, when a bypass circuit serving as a bypass current route is provided in parallel with a light emitting device such as, for example, an LED, the LED parallel to the bypass route may be turned OFF. Thus, a portion of a plurality of LEDs connected in series may be readily turned OFF. However, when the bypass circuit is not operated normally, the LEDs may not be turned OFF.

For example, in a case where the LEDs are applied to a vehicular headlight, a turn-OFF operation of the LEDs becomes important in connection with a distribution light source for a high beam, so as not to give a glare to oncoming vehicles or preceding vehicles. In this case, for example, when a bypass route is not normally functioned due to an abnormality thereof, the turn-OFF of the LEDs is not achieved, thereby giving a glare to, for example, an oncoming vehicle.

For this reason, it is required to precisely detect an operation abnormality of the bypass circuit side as well as an abnormality of the light emitting device side, so as to cope with these abnormalities.

Therefore, an object of the present disclosure is to precisely detect an abnormality of a bypass circuit side as well as an abnormality of a light emitting device side route in a configuration where the bypass circuit is provided in parallel to light emitting devices.

The vehicular lamp according to the present disclosure includes: a plurality of light emitting devices connected in series; a light source power supply configured to supply an emission driving current to the plurality of light emitting devices; one or more bypass units connected in parallel to at least some of the light emitting devices to form a bypass route of the emission driving current so as to cause the light emitting devices to be in a turn-OFF state according to a bypass control signal, or to cut off the bypass route of the emission driving current so as to cause the light emitting devices to be in a turn-ON state; an abnormality detecting unit configured to generate a state signal indicating whether the one or more bypass units are in a normal state or abnormal state; and a control unit configured to control the formation (ON) or the cut-off (OFF) of the bypass route. In particular, when a signal indicating that the one or more bypass units are abnormal is generated as the state signal, supply of the emission driving current from the light source power supply is reduced or stopped).

When the abnormality detecting unit detects an abnormal state of the bypass units, a bypass abnormality may be determined. The light emitting devices parallel to the bypass units may not be turned OFF when there is a bypass abnormality. Therefore, when the bypass abnormality is detected, the emission driving current is reduced or the supply of the emission driving current is stopped.

In the vehicular lamp according to the present disclosure as described above, the state signal generated by the abnormality detecting unit indicates a normal state of the light emitting device side by a first logic level, and an abnormal state of the light emitting device side by a second logic level, in a period where the one or more bypass units are instructed to cut off the bypass route by the bypass control signal during the supply of the emission driving current by the light source power supply. In contrast, the state signal indicates a normal state of the one or more bypass units by the second logic level and an abnormal state of the one or more bypass units by the first logic level, in a period where the one or more bypass units are instructed to form the bypass route by the bypass control signal during the supply of the emission driving current by the light source power supply.

Here, "a period during which a cut-off of a bypass route is instructed by a bypass control signal" refers to a period during which a turn-ON control of the light emitting devices is being performed by continuously or intermittently cutting off the bypass route. Specifically, the period includes a period during which a control is being performed to cause the light emitting device to be in a turn-ON state by continuously cutting off the bypass route, and a period during which a control is being performed to cause the light emitting device is in a dimming state by alternately performing a cut-off and a formation of the bypass route by a pulse type bypass control signal.

In this period, the normality/abnormality of the light emitting device side is determined by the state signal of the abnormality detecting unit.

Meanwhile, "a period during which a formation of a bypass route is instructed by a bypass control signal" refers to a period during which a turn-OFF control of a light emitting device is being performed. Specifically, the period refers to a period during which the bypass route is continuously formed so as to cause the light emitting device to be in the turn-OFF state. In this period, the normality/abnormality of the bypass unit is determined by the state signal of the abnormality detecting unit.

That is, the abnormality detecting function of the abnormality detecting unit is separately used in the turn-ON (including dimming) control period and in the turn-OFF control period.

In the vehicular lamp, when the supply of emission driving current by the light source power supply is initiated, a control of forming the bypass route is performed on each of the bypass units by the bypass control signal, and during the control of forming the bypass route, when at least one state signal output from the abnormality detecting unit corresponding to each of the one or more bypass units continuously indicates an abnormal state of the one or more bypass units for a predetermined time, it is determined that the one or more bypass units are in the abnormal state.

That is, for all the bypass units, a period during which a cut-off of a bypass route is instructed by the bypass control signal is set so as to detect whether a bypass abnormality is present. This processing becomes suitable when a light emission of the light emitting device is initiated so as to turn OFF the light emitting device.

In the vehicular lamp, during the supply of the emission driving current by the light source power supply, when a state signal output from an abnormality detecting unit corresponding to the one or more bypass units which perform the control of forming the bypass route by the bypass control signal continuously indicates an abnormal state of any of the one or more bypass units for a predetermined time, it is determined that the one or more bypass units are in the abnormal state.

That is, when a bypass unit is instructed to cut off a bypass route by the bypass control signal, it is detected whether a bypass abnormality is present on the bypass unit.

In the vehicular lamp, the abnormality detecting unit includes: a first circuit unit configured to generate a first state signal indicating whether the light emitting device side is normal or abnormal in a period where at least the bypass units are instructed to cut off the bypass route by the bypass control signal during the supply of the emission driving current by the light source power supply; and a second circuit unit configured to generate a second state signal indicating whether the bypass units are normal or abnormal irrespective of a control state by the bypass control signal during the supply of the emission driving current by the light source power supply.

With this configuration, the bypass abnormality may be detected irrespective of a control state by the bypass control signal.

The vehicular lamp further includes a control unit configured to perform control processings of supplying the emission driving current by the light source power supply, outputting the bypass control signal to the one or more bypass units, and detecting the abnormal state of the one or more bypass units and the light emitting device side by monitoring the state signal. In particular, the control unit performs a control of reducing or stopping the supply of the emission driving current from light source power supply when the abnormal state of the bypass units or the light emitting device side is detected by the state signal.

That is, the control unit performs either detection of a bypass abnormality or an abnormality handling processing.

According to the present disclosure, it is possible to appropriately detect an occurrence of an abnormal state where an emission driving current cannot bypass in a bypass route corresponding to a light emitting device. Thus, a proper processing may be performed for handling the bypass abnormality, for example, a turn-OFF processing or a dimming processing, so as not to give a glare to an oncoming vehicle or a preceding vehicle.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The exemplary embodiments described in the detailed description, drawing, and claims are not meant to be limiting. Other exemplary embodiments may be utilized, and other changes may be made, without departing from the spirit or scope of the subject matter presented here.

Hereinafter, exemplary embodiments of a vehicular lamp of the present disclosure will be described. Exemplary embodiments may be used for, for example, a vehicular headlight, and is especially appropriate for a high beam lamp.

1. Overall Configuration

Figure 1:
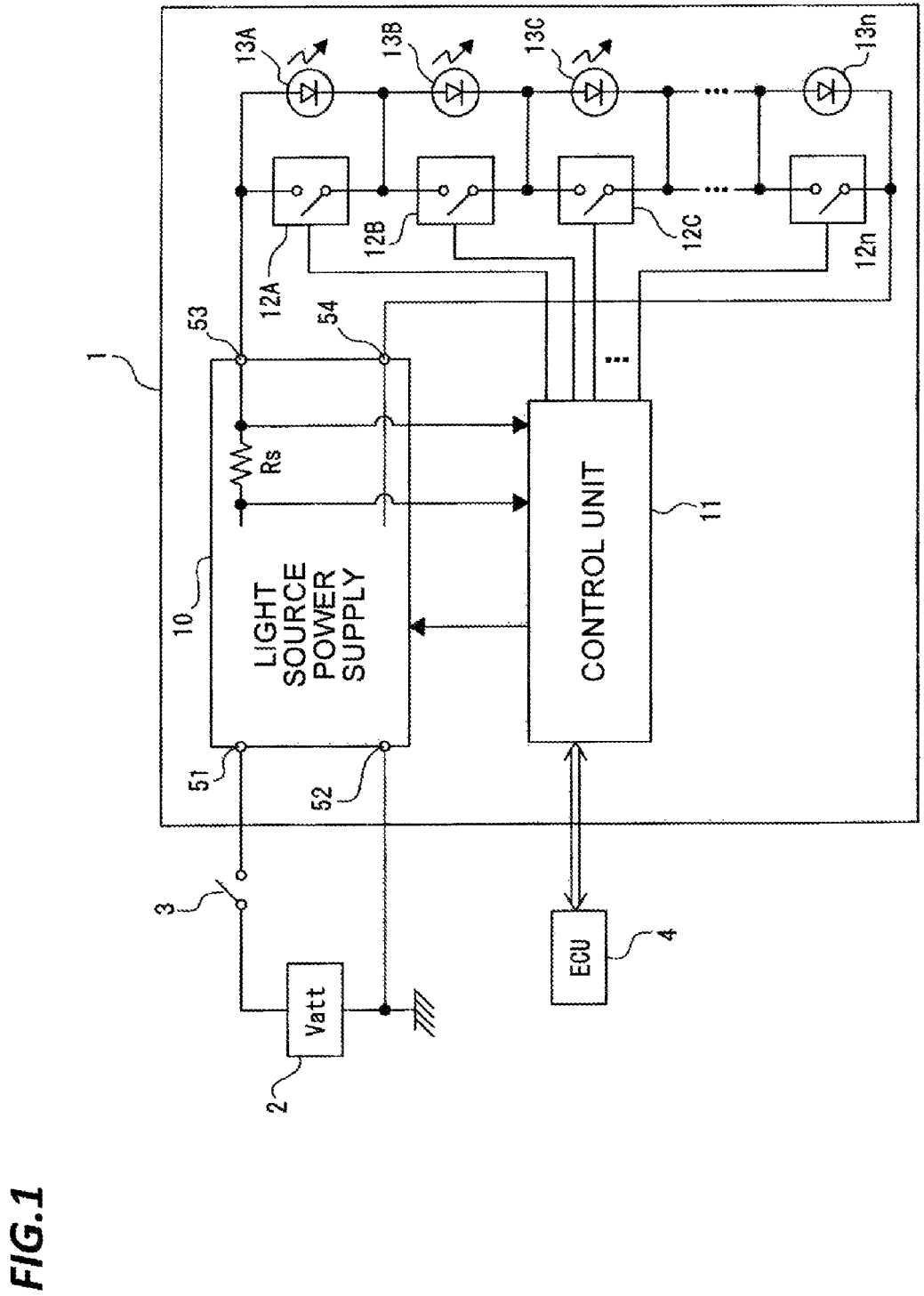
FIG. 1 is a block diagram of a vehicular lamp according to an exemplary embodiment of the present disclosure.

Descriptions will be made on an overall configuration of a vehicular lamp 1 according to an exemplary embodiment with reference to FIG. 1. The vehicular lamp 1 includes a light source power supply 10, a control unit 11, parallel circuit units 12A to 12n, and LEDs 13A to 13n. FIG. 1 also illustrates a vehicle battery 2, a lighting switch 3, and an electronic control unit ("ECU") 4.

For the convenience of description, the parallel circuit units 12A to 12n, and the LEDs 13A to 13n are collectively referred to as "parallel circuit unit(s) 12" and "LED(s) 13," especially when it is not required to distinguish individual ones from others.

In the vehicular lamp 1, n LEDs illustrated as the LEDs 13A to 13n are connected in series, as light emitting devices serving as semiconductor light sources.

In the vehicular lamp 1, when the lighting switch 3 is turned ON, the light source power supply 10 causes an emission driving current to flow in the LEDs 13A to 13n by a DC voltage from the vehicle battery 2 so that the LEDs 13A to 13n are operated to emit light.

The light source power supply 10 is formed by, for example, a DC-DC converter serving as a switching regulator. An input side of the light source power supply 10 is connected to a positive pole and a negative pole (ground) of the vehicle battery 2 via terminals 51 and 52. An output side of the light source power supply 10 is connected to anode terminals and cathode terminals of the n LEDs 13A to 13n which constitute a light source, via terminals 53 and 54. That is, the light source power supply 10 steps up or down the DC voltage between the terminals 51 and 52 to generate an output voltage for a light emission driving of the LEDs 13A to 13n and output the output voltage between the terminals 53 and 54. Accordingly, the light source power supply 10 supplies a light emission driving current to the LEDs 13A to 13n. A resistor Rs is configured to detect an output current.

The control unit 11 is constituted by, for example, a microcomputer configured to control the supply of the emission driving current from the light source power supply 10. That is, the control unit 11 performs an ON/OFF control of a converter operation for the light source power supply 10, or a switching control (an output current stabilization control by a PWM switching) of the switching regulator when the converter is operated. Specifically, in order to stabilize the output current of the light source power supply 10, the control unit 11 detects the output current by the voltage across the output current detecting resistor Rs to perform the ON/OFF control of a switching element of the switching regulator according to the detected current. That is, the control unit 11 controls a duty ratio of an ON/OFF control signal of the switching element.

The control unit 11 may perform a processing of reducing the amount of the emission driving current supplied from the light source power supply 10, or, in a case of pulse emission, reducing an average emission driving current by controlling the duty ratio of the pulses or a switching frequency.

Figure 2:
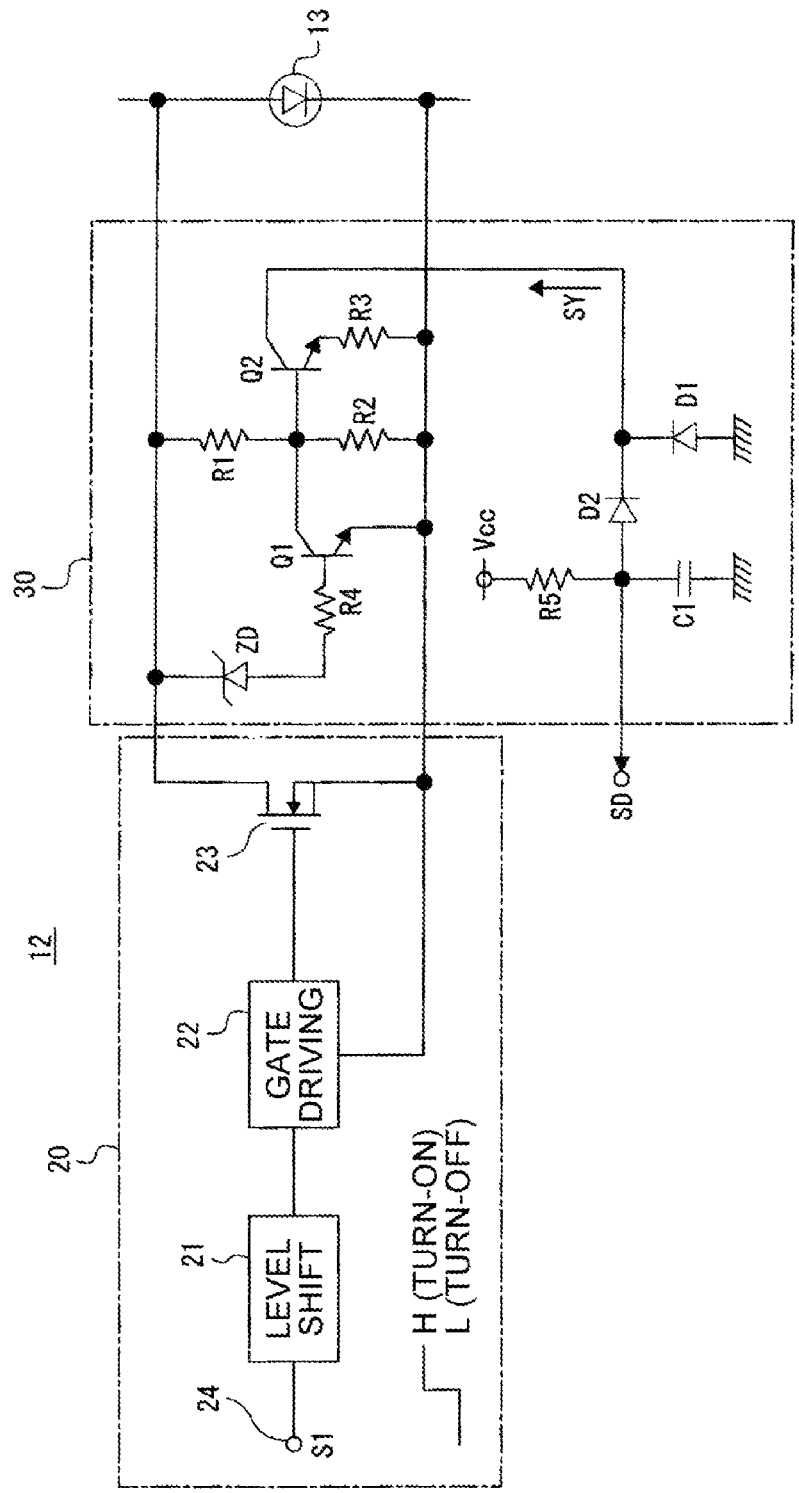
FIG. 2 is a circuit diagram of a bypass unit according to a first exemplary embodiment.

In the present exemplary embodiment, the parallel circuit units 12A to 12n are connected in parallel to the LEDs 13A to 13n which are connected in series, respectively. As illustrated in FIG. 2, a parallel circuit unit 12 includes a bypass unit 20 and an abnormality detecting unit 30.

The control unit 11 controls the formation (ON) or the cut-off (OFF) of a bypass route of an emission driving current by the parallel circuit units 12A to 12n, and performs an abnormality detection of the bypass route and the LEDs 13A to 13n. According to the abnormality detection, the control unit 11 controls the light source power supply 10 to stop or reduce the supply of the emission driving current, or notifies the abnormality to the outside (ECU 4).

As described later in detail, for example, when a bypass route is formed in the parallel circuit unit 12A, an emission driving current to be applied to the LED 13A passes through the bypass route so that the LED 13A is turned OFF. That is, the control unit 11 is configured to control the formation and cut-off of a bypass route for each of the parallel circuit units 12A to 12n, and may control the turn-ON/OFF of each of the LEDs 13A to 13n. An abnormality detecting circuit is further provided in each of the parallel circuit units 12A to 12n, so that the control unit 11 may detect a route abnormality of the LED side or a bypass abnormality.

As described above, the control unit 11 controls the parallel circuit units 12A to 12n so that each of the parallel circuit units 12A to 12n controls a light emission operation of corresponding one of the LEDs 13A to 13n. That is, when a bypass route formed by a parallel circuit unit 12 is continuously turned ON, a corresponding LED 13 is turned OFF, and when the bypass route is continuously turned OFF, the corresponding LED 13 is turned ON. Also, the bypass route may be turned ON/OFF at a high frequency (e.g., several hundreds of Hz) to dim the corresponding LED 13. Further, the dimming may be performed by changing the ON-duty in the ON/OFF control.

When there is an abnormality in the bypass route so that the emission driving current cannot bypass, the corresponding LED 13 may not be turned OFF. For example, when the LED 13 used for a high beam of a vehicle headlamp could not be turned OFF, a glare will be given to an oncoming vehicle. Thus, measures are required. Therefore, in the present exemplary embodiment, the parallel circuit units 12A to 12n are configured to detect not only the LED 13 side abnormality but also an abnormality where a current cannot bypass in the bypass route.

2. First Exemplary Embodiment

FIG. 2 illustrates a configuration of the parallel circuit unit 12 in the first exemplary embodiment. As described above, the parallel circuit unit 12 is connected in parallel to the LED 13, and has a circuit configuration which is largely divided into the bypass unit 20 and the abnormality detecting unit 30.

The bypass unit 20 includes a level shift circuit 21, a gate driving circuit 22, and a bypass switch 23 constituted by a metal oxide semiconductor-field effect transistor (MOS-FET). Although an N channel MOS-FET is used for the bypass switch 23, a P channel MOS-FET may be used as well.

The drain-source of the bypass switch 23 is connected in parallel to the anode-cathode of the LED 13. When the bypass switch 23 is turned ON, a current route bypassing the LED 13 is formed and the LED 13 is turned OFF.

A bypass control signal S1 is supplied to a terminal 24 from the control unit 11. The level of the bypass control signal S1 is adjusted by the level shift circuit 21 so that the bypass control signal S1 is given as a gate voltage to the bypass switch 23 by the gate driving circuit 22.

The level shift is performed because the LEDs 13A to 13n and the parallel circuit units 12A to 12n are connected in parallel, respectively, and as a result, the voltage of each of the bypass units 20 and the abnormality detecting units 30 is floating from a reference voltage (a ground voltage). When the output of the light source power supply 10 is the positive pole, the level shift circuit 21 performs the level shift for a gate driving to increase the voltage, and when the output of the light source power supply 10 is the negative pole, the level shift circuit 21 performs the level shift to reduce the voltage. In the present exemplary embodiment, the polarity of the output of the light source power supply 10 is negative.

In the present exemplary embodiment, the bypass control signal S1 serves as a control signal for a turn-ON instruction when its level is high (level H) and as a control signal for a turn-OFF instruction when its level is low (level L). That is, the gate driving circuit 22 is configured such that, when the bypass control signal S1 is in the level H, the gate voltage becomes the level L so that the bypass switch 23 is turned OFF. In this case, the bypass route is cut off, that is, the LED 13 is turned ON. Meanwhile, when the bypass control signal S1 is in the level L, the gate voltage becomes the level H so that the bypass switch 23 is turned ON. In this case, the bypass route is formed, that is, the LED 13 is turned OFF.

The abnormality detecting unit 30 is configured as a circuit capable of detecting an abnormality of the LED 13 side ("light-emitting side abnormality"), and an abnormality of the bypass unit 20 ("bypass abnormality").

Specifically, the light-emitting side abnormality refers to, for example, a short-circuit, an open-circuit (disconnection), or harness opening of the LED 13, or a wiring abnormality between the terminals 53 and 54 of the light source power supply 10 and the LED 13.

The bypass abnormality refers to an abnormality of a bypass element such as the level shift circuit 21, the gate driving circuit 22, and the bypass switch 23, that is an event where an emission driving current cannot bypass. Specifically, the bypass abnormality refers to, for example, an opening failure of the bypass switch 23 or a failure of the gate driving circuit 22.

The abnormality detecting unit 30 includes NPN-type transistors Q1 and Q2, resistors R1 to R5, a Zener diode ZD, diodes D1 and D2, and a condenser C1.

The resistors R1 and R2 divide a drain-source voltage of the bypass switch 23 as a series circuit of the resistors R1 and R2 is connected between the drain and the source of the bypass switch 23. A voltage division node of the resistors R1 and R2 is connected to the collector of the transistor Q1 and the base of the transistor Q2.

The cathode of the Zener diode ZD is connected to the anode side of the LED 13, and the anode side of the Zener diode ZD is connected to the base of the transistor Q1 via the resistor R4. A Zener voltage of the Zener diode ZD is set to be higher than a forward voltage Vf of the LED 13.

The emitter of the transistor Q1 is connected to the cathode side of the LED 13. The emitter of the transistor Q2 is connected to the cathode side of the LED 13 via the resistor R3. The collector of the transistor Q2 is connected to a connection point of the cathode of the diodes D1 and D2. The anode side of the diode D1 is grounded, and the anode side of the diode D2 is connected to a connection point of the resistor R5 and the condenser C1. A predetermined voltage Vcc is applied to the resistor R5.

A state signal SD for the control unit 11 is output from the connection point of the resistor R5 and the condenser C1. The state signal SD is a signal indicating an abnormal state or a normal state, that is, an abnormality detecting signal.

The diodes D1, D2 are connected as described above so that the state signal SD to be supplied to the control unit 11 does not become a negative voltage.

In the configuration, the abnormality detecting unit 30 performs an abnormality detection based on a drain-source voltage Vds of the bypass switch 23. The drain-source voltage Vds in the normal state is about 0 V when the bypass switch 23 is turned ON, and is a forward voltage Vf of the LED 13 when the bypass switch 23 is turned OFF.

Meanwhile, in a case where the LED 13 is opened, the drain-source voltage Vds becomes higher than the forward voltage Vf when the bypass switch 23 is turned OFF. Also, in a case where the LED 13 or the output wiring is short-circuited, the drain-source voltage Vds becomes about 0V when the bypass switch 23 is turned OFF. Accordingly, the abnormality detecting unit 30 may output the state signal SD according to the light-emitting side abnormality. Also, even when the bypass abnormality occurs due to the above-described circuit configuration, the abnormality detecting unit 30 may output the state signal SD according the bypass abnormality. Hereinafter, a specific abnormality detecting operation will be described.

Figure 3:
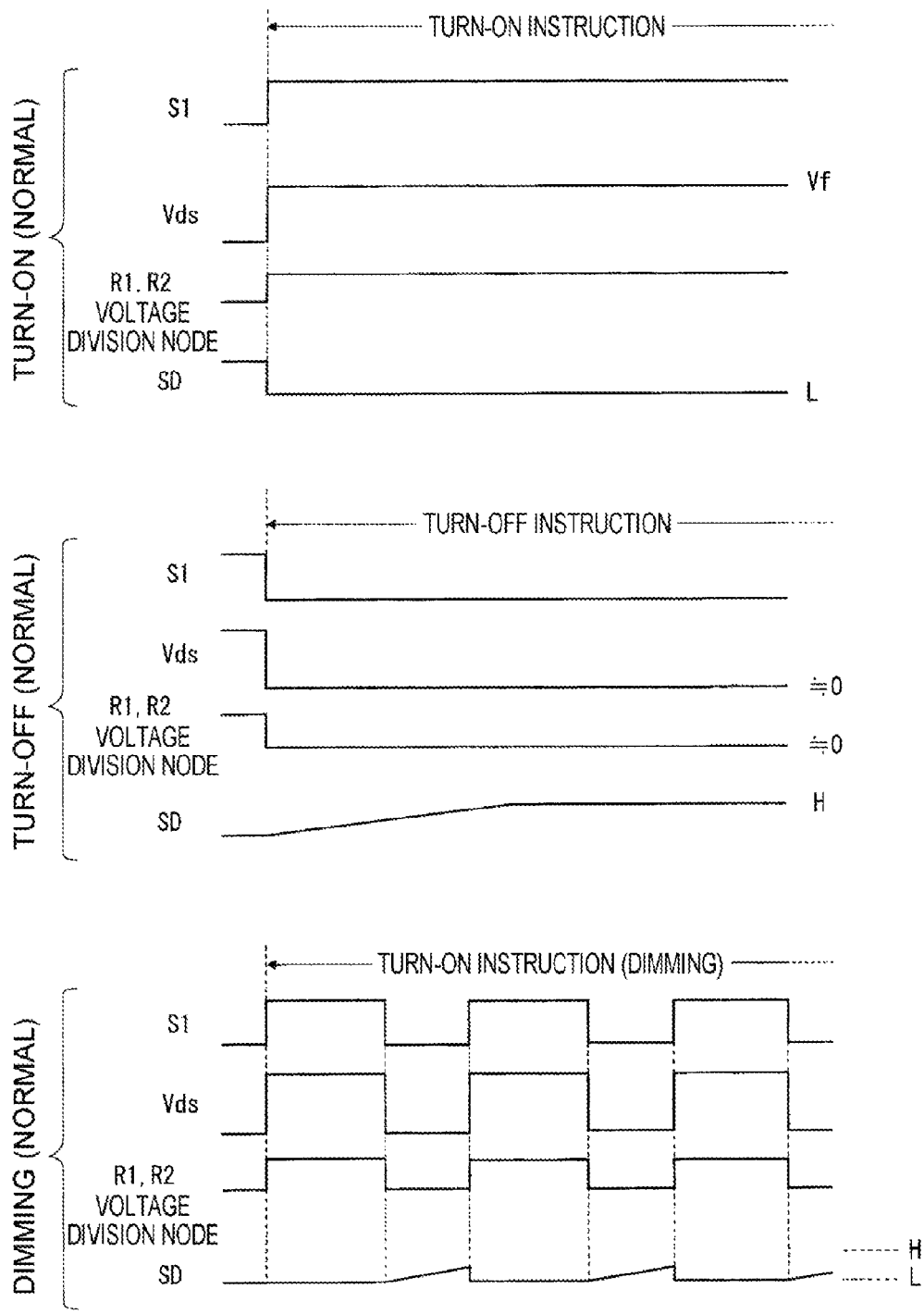
FIG. 3 is an explanatory view of operation waveforms in a normal state according to an exemplary embodiment.

FIG. 3 illustrates waveforms of respective units in a normal state.

First, the waveforms obtained when the LEDs are normally turned ON will be described. The control unit 11 sets the level of a bypass control signal S1 to the level H to make a turn-ON instruction. Accordingly, the bypass switch 23 is turned OFF. In this case, the Zener diode ZD is not conductive. The drain-source voltage Vds of the bypass switch 23 becomes Vf, and the voltage division node of the resistors R1 and R2 rises so that the transistor Q2 is turned ON. Accordingly, a sink current SY flows so that the potential at the connection point of the condenser C1 and the resistor R5, that is, the state signal SD becomes the level L.

When the LEDs are normally turned OFF, the control unit 11 sets the bypass control signal S1 to be in the low L so as to make a turn-OFF instruction. Accordingly, the bypass switch 23 is turned ON. The Zener diode ZD is not conductive. The drain-source voltage Vds of the bypass switch 23 becomes about 0V, and the voltage across the voltage division node of the resistors R1 and R2 also decreases so that the transistor Q2 is turned OFF. Accordingly, the sink current SY does not flow and the condenser C1 is gradually charged so that the state signal SD gradually rises to the level H.

In the case of a normal dimming, the control unit 11 may switch the bypass control signal S1 between the level H and the level L at a high frequency, so that bypass switch 23 is repeatedly turned ON/OFF. That is, the above described turn-ON and turn-OFF states are alternated so that "flowing" and "not-flowing" of the sink current SY will be alternated. In a period where the sink current SY flows (the period where the voltage across the voltage division node of the resistors R1 and R2 rises so that the transistor Q2 is turned ON), the condenser C1 is discharged and the state signal SD becomes the level L. In a period where the sink current SY does not flow (the period where the voltage across the voltage division node of the resistors R1 and R2 becomes about 0V so that the transistor Q2 is turned OFF), the condenser C1 is charged and the state signal SD is gradually increased. Meanwhile, by the resistor R5 and the condenser C1, a sufficiently long charging time constant is set for the period of the bypass control signal S1. That is, charging is slowly performed and discharging is quickly performed. Accordingly, the state signal SD is maintained in the level L.

For example, when the frequency of repeating ON/OFF of the bypass switch 23 is set to be several hundreds of Hz in order to perform dimming, the charging time constant may be set to be several tens of ms, and the discharging time constant may be set to be several hundreds of μs. Accordingly, at the normal dimming, the level of the state signal SD becomes L.

Figure 4:
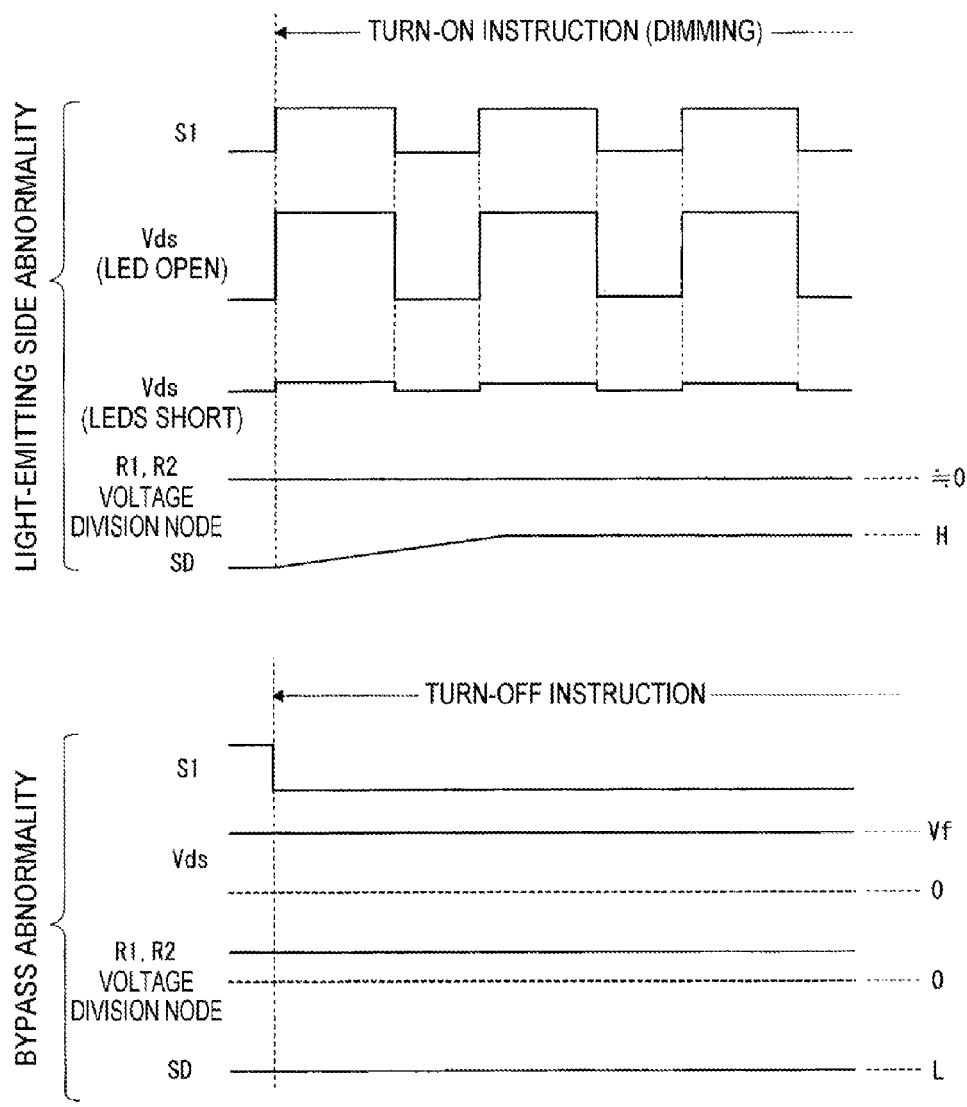
FIG. 4 is an explanatory view of operation waveforms in a normal state according to an exemplary embodiment.

FIG. 4 illustrates cases of a light-emitting side abnormality and a bypass abnormality.

The light-emitting side abnormality is an abnormal state detected when a turn-ON instruction (including a dimming instruction) is made, and the bypass abnormality is an abnormal state detected when a turn-OFF instruction is made.

FIG. 4 illustrates a case where the light-emitting side abnormality occurs as an example when the dimming is performed. The bypass control signal S1 alternates between the level H and the level L so as to intermittently cut off the bypass route.

In a case where opening of the LED 13 occurs due to the light-emitting side abnormality, when the bypass switch 23 is turned OFF, the drain-source voltage Vds becomes higher than the forward voltage Vf. Accordingly, the Zener diode ZD is conductive, and the transistor Q1 is turned ON so that the voltage across the voltage division node does not rise. The transistor Q2 is turned OFF so that the sink current SY does not flow.

In a case where short-circuit of the LED 13 occurs, when the bypass switch 23 is turned OFF, the drain-source voltage Vds is about 0V, and the voltage across the voltage division node does not rise. The transistor Q2 is turned OFF so that the sink current SY does not flow.

Accordingly, in a case where a light-emitting side abnormality such as, for example, opening, short-circuit, or wiring abnormality of the LED 13, occurs, the level of the state signal SD is gradually increased to the level H.

Likewise, in a case where full lighting rather than dimming is performed, that is, in a case where the level of the bypass control signal S1 continuously in the level H so that the bypass route is continuously cut off, when the light-emitting side abnormality occurs, the sink current SY does not flow so that the state signal SD also becomes the level H.

Meanwhile, occurrence of the bypass abnormality results in the following. A turn-OFF instruction causes the bypass route to be functioned. The control unit 11 makes a turn-OFF instruction by setting the bypass control signal S1 to be the level L so that the bypass route is continuously formed. Accordingly, the bypass switch 23 is turned ON. When the bypass switch 23 remains OFF due to the bypass abnormality, the drain-source voltage Vds is fixed to be equal to the forward voltage Vf. Accordingly, the voltage across the voltage division node rises and the transistor Q2 is turned ON so that the sink current SY flows. As a result, the state signal SD also becomes the level L.

The above-described operation may be summarized as follows.

In the period where a turn-ON instruction (including a dimming instruction) is made by the bypass control signal S1, the state signal SD becomes the level L in the normal state. However, when an abnormality (a light-emitting side abnormality) occurs, the state signal SD becomes the level H.

In the period where a turn-OFF instruction is made by the bypass control signal S1, the state signal SD becomes the level H in the normal state. However, when an abnormality (a bypass abnormality) occurs, the state signal SD becomes the level L.

As the abnormality detecting unit 30 is operated as described above, the control unit 11 performs an abnormality detection as follows.

Figure 5:
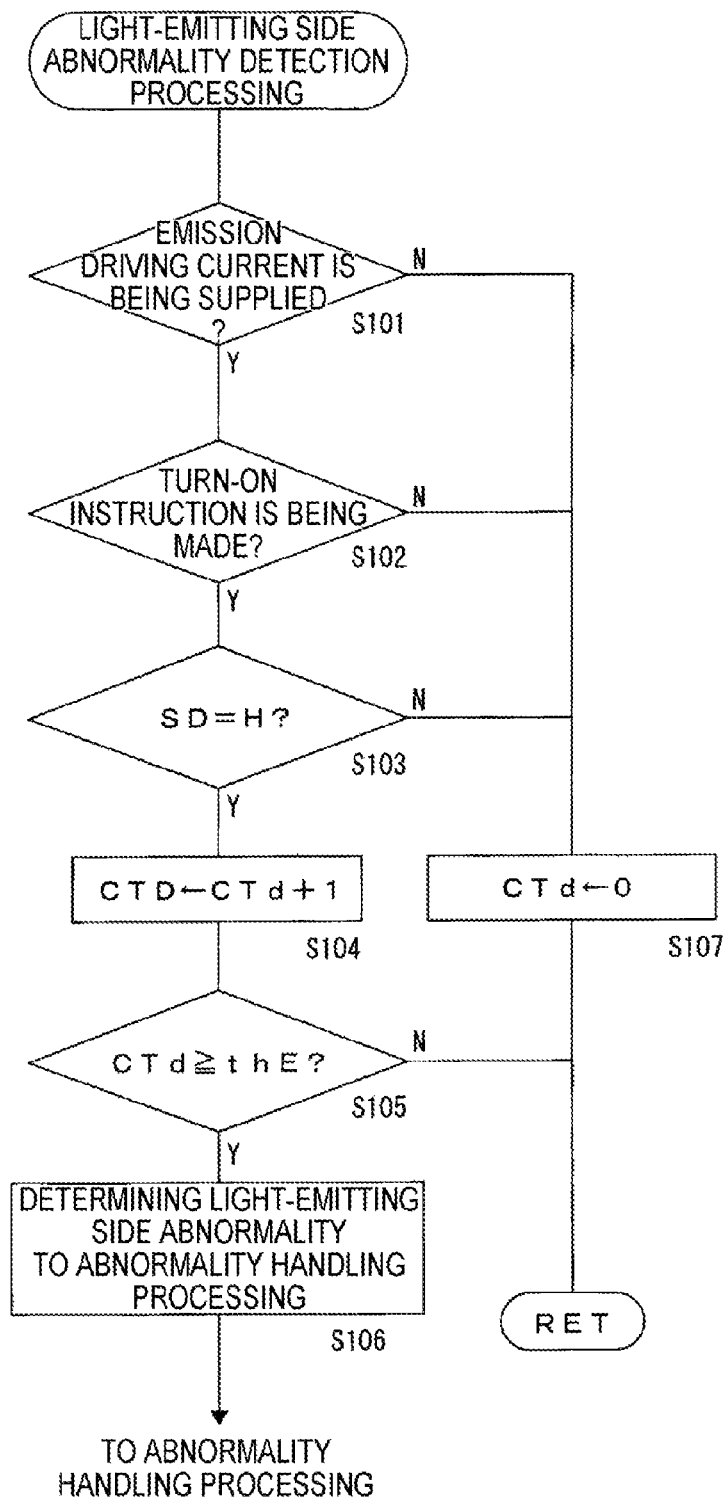
FIG. 5 is a flowchart of a processing of detecting a light-emitting side abnormality according to an exemplary embodiment.

FIG. 5 illustrates an example of an abnormality detection processing for detecting a light-emitting side abnormality.

The control unit 11 determines, in step S101, whether an emission driving current is currently being supplied from the light source power supply 10. In step S102, the control unit 11 determines whether a turn-ON instruction is being made. That is, it is determined whether the bypass control signal S1 is output in the level H, or H/L high frequency pulses are output so that turn-ON or dimming is being instructed.

In steps S101 and S102, when it is determined that the emission driving current is being supplied and the turn-ON instruction is being made, the control unit 11 determines whether the state signal SD is output at the level H in step S103. In the normal state, the level of the state signal SD will be in the level L.

In steps S101 to S103 as described above, when the emission driving current is not being supplied, the turn-ON instruction is not being made, or the state signal SD is in the level L, in step S107, an abnormality determination counter CTd is cleared to be 0.

In step S103, when the state signal SD is in the level H, the control unit 11, in step S104, increments the abnormality determination counter CTd, and then, in step S105, determines whether the value of the abnormality determination counter CTd becomes equal to or larger than a predetermined value thE. Unless the value of the abnormality determination counter CTd reaches the predetermined value thE, it is not yet determined that an abnormality occurs. When the value of the abnormality determination counter CTd becomes equal to or larger than the predetermined value thE, in step S106, it is determined that the light-emitting side abnormality occurs. Then, a predetermined abnormality handling processing is performed. For example, the control unit 11 stops the supply of the light emission driving current from the light source power supply 10 or notifies the ECU 4 of abnormality occurrence.

When the processing in FIG. 5 is performed, the level H of the state signal SD is continuously observed for a predetermined period during the turn-ON instruction. As a result, the abnormality determination is made. The reason of making the abnormality determination based on the fact that the state signal SD is continuously in the level H during the period where the abnormality determination counter CTd reaches the predetermined value is to stabilize the abnormality determination processing.

Figure 6:
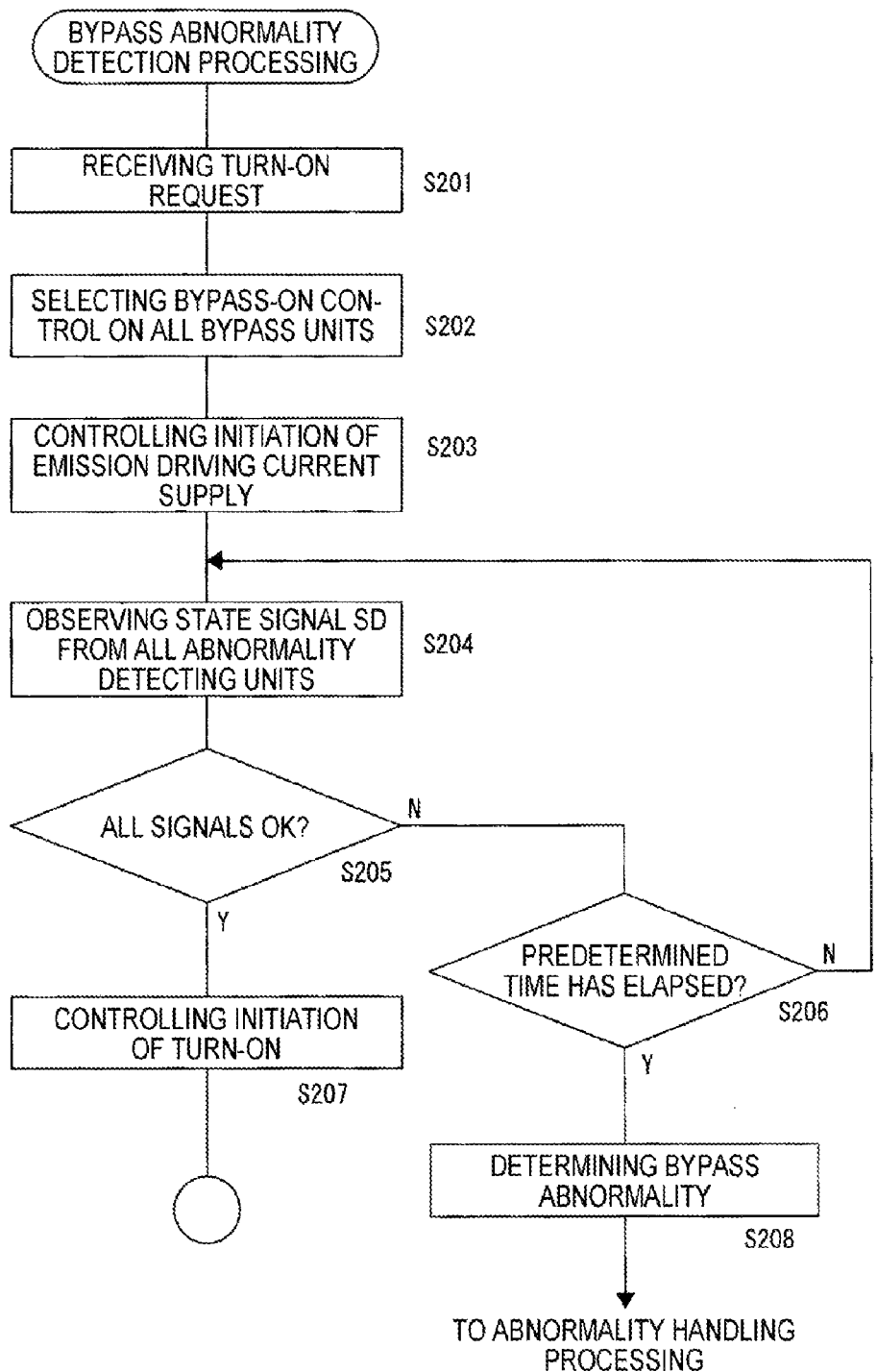
FIG. 6 is a flowchart of a processing of detecting a bypass abnormality at start-up of an exemplary embodiment.

FIG. 6 illustrates an example of a processing of detecting a bypass abnormality by the control unit 11. The bypass abnormality is detected in a period where a bypass route is formed by the bypass unit 20.

The bypass route formation period refers to a turn-OFF instruction period or an ON period while the bypass switch 23 is turned ON/OFF so as to perform dimming. However, during the dimming, the ON period of the bypass switch 23 ranges from several hundreds of μs to several msec, and thus it is difficult to detect the bypass abnormality by defining the period. Therefore, the detection is performed when the turn-OFF instruction is made or by providing a turn-OFF instruction period for abnormality detection.

FIG. 6 illustrates an example of detecting a bypass abnormality when initiating turn-ON. The control unit 11 receives a turn-ON request from the ECU 4 (step S201). Accordingly, the control unit 11 initiates a turn-ON control of the LEDs 13A to 13n. That is, the control unit 11 performs a bypass-on control on all the bypass units 20 (bypass control signal S1=L) (step S202). Then, the supply of the emission driving current from the light source power supply 10 is initiated (step S203).

In this state, the control unit 11 observes a state signal SD output from the abnormality detecting unit 30 for all the parallel circuit units 12A to 12n (step S204). When a bypass route is normally formed, the state signal SD gradually rises to the level H (see, e.g., the waveform at turn-OFF in FIG. 3). However, a certain time period is required until the level of the signal SD becomes the level H by the above described time constant set by the resistor R5 and the condenser C1.

Therefore, the control unit 11 determines whether levels of all the state signals SD are in the level H (step S205). When this is not satisfied, the control unit 11 determines whether a predetermined time (a time determined according to the charging time constant of the condenser C1) has elapsed from the initiation of supply of the emission driving current (step S206). When the predetermined time has not elapsed, all the state signals SD are observed again in step S204 and the determination is performed in step S205.

When the state signals SD output from all the parallel circuit units 12A to 12n become the level H within the predetermined time in step S206, it is determined that the bypass routes in all the parallel circuit units 12A to 12n are normal. Therefore, the control unit 11 proceeds to step S207 to control the initiation of turn-ON. Specifically, for example, the turn-ON (dimming) of the LEDs 13A to 13n is performed by setting the bypass control signal S1 for each of the parallel circuit units 12A to 12n to be the level H (or high frequency pulses).

Meanwhile, when the state where all the state signals SD become the level H is not determined even after a predetermined time has elapsed, it may be determined that a bypass abnormality occurs in any one of parallel circuit units 12. Therefore, the control unit 11 proceeds from step S206 to S208, determines that a bypass abnormality occurs, and performs a predetermined abnormality handling processing. For example, the control unit 11 stops the supply of the emission driving current from the light source power supply 10 or notifies the ECU 4 of abnormality occurrence.

Figure 7:
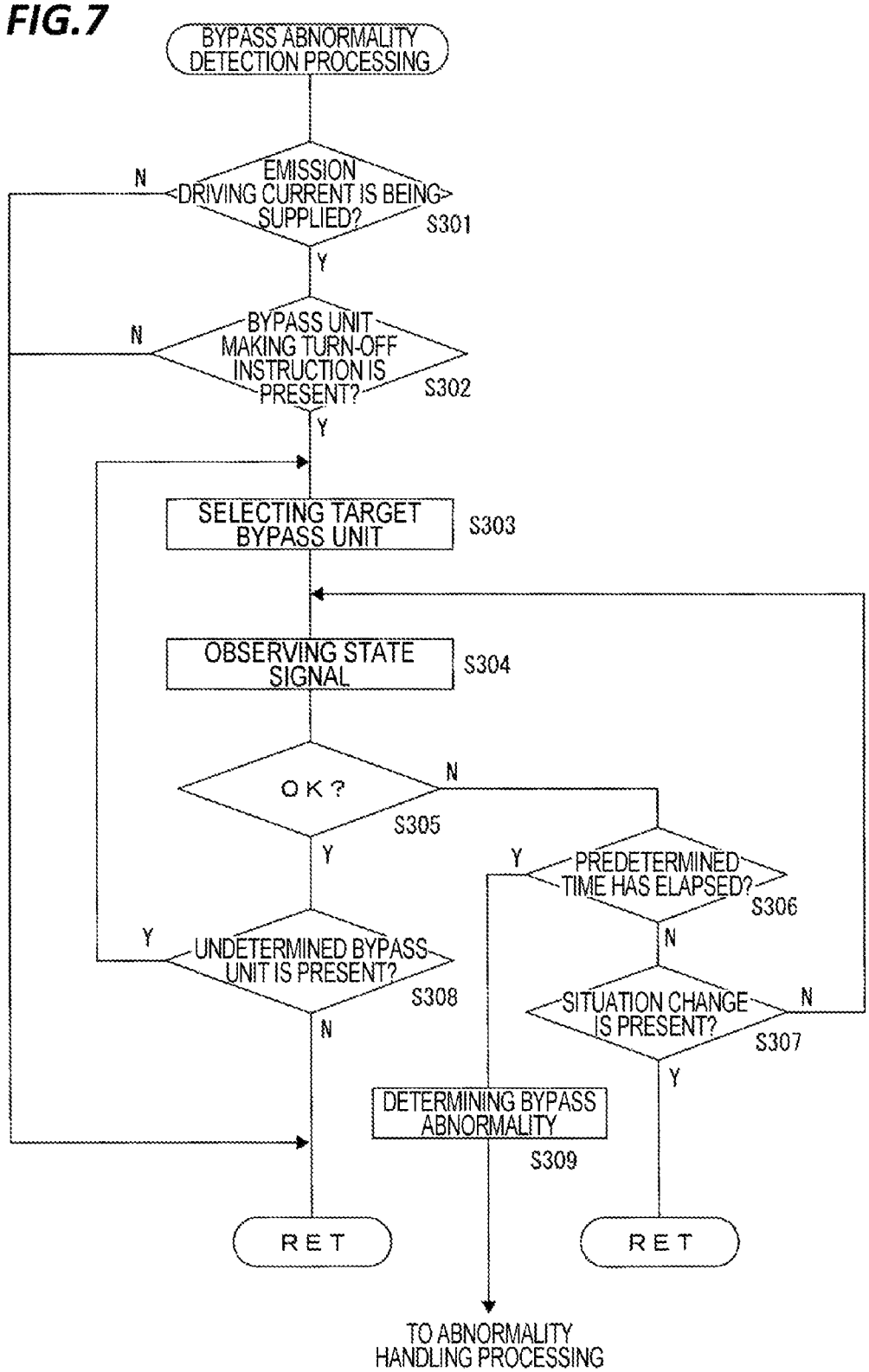
FIG. 7 is a flowchart of a processing of detecting a bypass abnormality at an operation of an exemplary embodiment.

FIG. 7 illustrates an example of detecting a bypass abnormality on a bypass unit 20 which makes a turn-OFF instruction among respective bypass units 20 of the parallel circuit units 12A to 12n.

The control unit 11 determines, in step S301, whether an emission driving current is currently being supplied from the light source power supply 10. In step S302, the control unit 11 determines whether at least one bypass unit 20 which is making a turn-OFF instruction is currently present. That is, it is determined whether a bypass control signal S1 with the level L is given to the at least one bypass unit 20. When the emission driving current is not being supplied, or the turn-ON instruction (including a dimming instruction) is being made on the bypass units 20 of all the parallel circuit units 12A to 12n, the detection of bypass abnormality is not performed.

When a turn-OFF instruction is made on one or more bypass units 20, the control unit 11, in step S303, selects one bypass unit 20 as a detection target among the bypass units 20 which are making turn-OFF instructions. In step S304, a state signal SD related to the selected bypass unit 20 and output from the abnormality detecting unit 30 is observed.

When the bypass route is normally formed, the state signal SD is in the level H. However, in consideration of the charging time constant of the condenser C1, even if the state signal SD is in the level L, it is not yet determined that there is a bypass abnormality until a predetermined time elapses in step S306. For example, the predetermined time may be counted from a point of time the process proceeds to step S303, or may be counted from a point of time a turn-OFF instruction is initiated for the bypass unit 20.

The turn-ON situation may be changed by an operation of a vehicle driver or an instruction from the ECU 4. For example, the LED 13 may be switched from turn-OFF to turn-ON. When there is a change in lighting-ON situation, the abnormality detection processing is finished from step S307.

When the predetermined time has not elapsed and there is no change in the situation, the process proceeds back to step S304 to observe the state signal SD again.

When it is determined that the predetermined time has elapsed in step S306 while the state signal SD remains at the level L, it is determined, in step S309, that a bypass abnormality occurs, to perform a predetermined abnormality handling processing. For example, the control unit 11 stops the supply of the emission driving current from the light source power supply 10 or notifies the ECU 4 of abnormality occurrence.

Meanwhile, when it is determined that the state signal SD is in the level H in step S305, it is determined that there is no bypass abnormality in relation to the bypass unit 20. Then, in step S308, it is determined whether there is any non-determined bypass unit 20 which is making a turn-OFF instruction. When there is any non-determined bypass unit 20, the bypass unit 20 is selected as a detection target in step S303 and the same processing as described above is performed on the bypass unit 20 as well.

As described above, in the first exemplary embodiment, the vehicular lamp includes: a plurality of LEDs 13 (13A to 13n) connected in series; a light source power supply 10 configured to supply an emission driving current to the plurality of LEDs 13; a bypass unit 20 connected in parallel to each of the LEDs 13 to form a bypass route of an emission driving current so as to cause the LEDs 13 to be in a turn-OFF state according to a bypass control signal S1, or to cut off the bypass route of the emission driving current so as to cause the LEDs 13 to be in a turn-ON state; and an abnormality detecting unit 30 configured to generate a state signal SD indicating whether the bypass unit 20 is in an abnormal state or a normal state. When a signal indicating that the bypass unit 20 is abnormal is generated as the state signal SD, the emission driving current supplied from the light source power supply 10 is reduced or stopped.

As described above, the abnormal state of the bypass unit 20 may be detected by the abnormality detecting unit 30 to determine a bypass abnormality. When the bypass abnormality occurs, the LEDs 13 connected in parallel to the bypass unit 20 cannot be turned OFF. For example, the turn-OFF of a high beam cannot be performed and as a result, glare is given to an oncoming vehicle. In the present exemplary embodiment, the supply of the emission driving current may be reduced or stopped according to the detection of the bypass abnormality so that the problem itself may be suppressed.

In a period where the bypass unit 20 is instructed to continuously or intermittently cut off the bypass route by the bypass control signal S1 during the supply of the emission driving current by the light source power supply 10, the state signal SD generated by the abnormality detecting unit 30 indicates the normal state of the light emitting device side by the level L (first logic level) and indicates the abnormality at the light-emitting side by the level H (second logic level). The period in which continuous or intermittent cut-off of a bypass route is instructed by the bypass control signal S1 refers to a period in which a turn-ON instruction or a dimming instruction is made to perform the turn-ON or dimming of the LEDs 13. In this period, it is natural that the LEDs 13 serving as light emitting devices should be in the turn-ON state or dimming state. When the LEDs 13 are in the turn-OFF state, it should be detected as an abnormal state. Therefore, in the present exemplary embodiment, the abnormal/normal state of the light emitting device side is determined by the state signal SD.

Meanwhile, in a period where the bypass unit 20 is instructed to continuously form a bypass route by the bypass control signal S1 during the supply of the emission driving current by the light source power supply 10, the state signal SD indicates the normal state of the bypass unit 20 by the level H (second logic level) and indicates an abnormal state of the bypass unit 20 by the level L (first logic level). The period in which the continuous formation of a bypass route is instructed by the bypass control signal S1 refers to a period in which a turn-OFF instruction is made to perform the turn-OFF of the LEDs 13. In the period of the turn-OFF instruction, it is natural that the LEDs 13 serving as light emitting devices should be in the turn-OFF state. When the LEDs 13 are not in the turn-OFF state, it should be detected as a bypass abnormal state. Therefore, in the present exemplary embodiment, the abnormal/normal state of the bypass unit 20 is determined by the state signal SD.

That is, in the present exemplary embodiment, in the period of controlling the turn-ON (including dimming) and in the period of controlling the turn-OFF, an abnormality detection function of the abnormality detecting unit 30 may be separately used so that the function of detecting the light-emitting side abnormality and the function of detecting the bypass abnormality may be properly exhibited. In addition, this may also simplify the circuit configuration of the abnormality detecting unit 30. For example, when the control unit 11 performs a detection corresponding to reversal of determination logics, both the detection of a bypass abnormality and the detection of a light-emitting side abnormality are enabled with a simple circuit configuration of generating a state signal SD based on a drain-source voltage of the bypass switch 23.

As illustrated in FIG. 6, when the supply of the emission driving current is initiated by the light source power supply 10, a formation control of bypass routes (turn-OFF instructions) is performed by bypass control signals S1 on all the bypass units 20. During the formation control, when at least one of state signals SD output from the abnormality detecting units 30 corresponding to the respective bypass units 20 continuously indicates an abnormal state of the corresponding bypass unit for a predetermined time, it is determined that the bypass units are in the abnormal state.

When the bypass abnormality detection is performed for a period during which the turn-OFF instruction is made, it becomes suitable to determine the bypass abnormality, for example, at a point of time of initiating a turn-ON. This is because after the turn-ON is initiated, it is difficult to perform an operation of turning OFF so as to detect an abnormality. Also, when at least one of the plurality of bypass units 20 is abnormal, a proper handling control to prevent occurrence of the above-described glare may be performed by determining it as a bypass abnormality state.

As illustrated in FIG. 7, for a bypass unit 20 which performs a formation control (a turn-OFF instruction) of a bypass route by a bypass control signal S1 during the supply of the emission driving current by the light source power supply 10, when a state signal SD output from an abnormality detecting unit 30 corresponding to the bypass unit 20 continuously indicates an abnormal state for a predetermined time, it is determined that the bypass unit is abnormal.

That is, when there is a bypass unit 20 instructed to perform turn-OFF, at that time, it is possible to detect whether there is a bypass abnormality in relation to the bypass unit. Determinations on whether the bypass units are abnormal or normal may be sequentially made.

Also, the control unit 11 performs processings of controlling the supply of the emission driving current by the light source power supply 10, outputting the bypass control signal S1 to the bypass unit 20, and detecting the bypass abnormality and the light-emitting side abnormality by monitoring the state signal SD. Then, when detecting the bypass abnormality or the light-emitting side abnormality according to the state signal SD, the control unit 11 controls the reduction or stopping of supply of the emission driving current from the light source power supply 10. When the control unit 11 is provided, the detection of bypass abnormality and light-emitting side abnormality or the abnormality handling processing may be properly performed. In particular, as illustrated in FIGS. 5, 6 and 7, the control unit 11 may perform a detection of the light-emitting side abnormality and the bypass abnormality by reversing determination logics on the state signal SD. Therefore, it is possible to handle both the detection of a bypass abnormality and the detection of a light-emitting side abnormality by the abnormality detecting unit 30 configured according to the present exemplary embodiment, which may contribute to reduction of a circuit scale.

3. Second Exemplary Embodiment

The second exemplary embodiment will be described with reference to FIG. 8. In the first exemplary embodiment, the control unit 11 observes a state signal SD to detect both the light-emitting side abnormality and the bypass abnormality through software processing in which the detection of the bypass abnormality is achieved by forcedly making a turn-OFF instruction in a period where a turn-OFF instruction is made or when initiating the detection. Whereas, the second exemplary embodiment is an example in which the light-emitting side abnormality and the bypass abnormality are separately detected by means of hardware so as to detect the bypass abnormality in real time.

Figure 8:
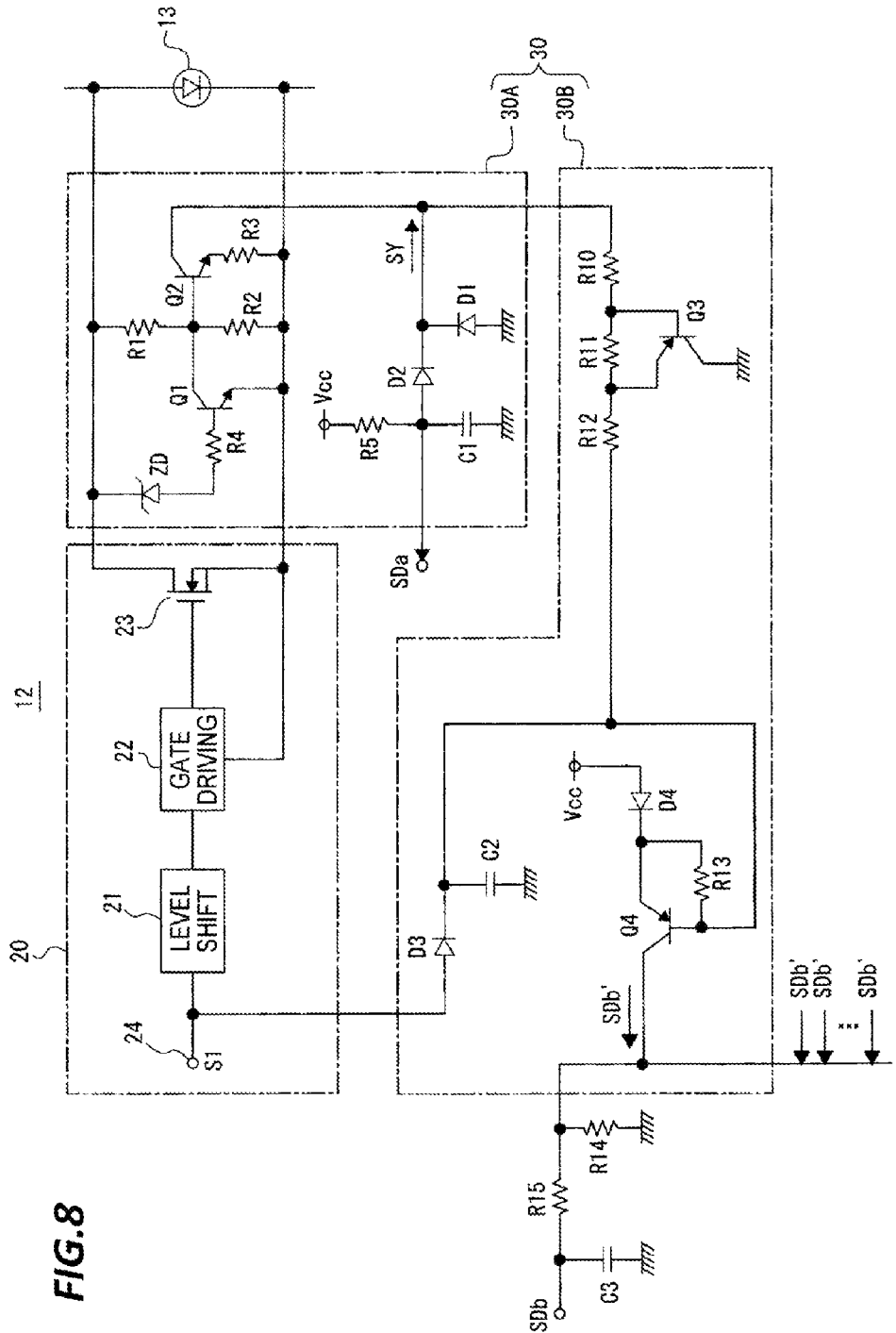
FIG. 8 is a circuit diagram of a bypass unit according to a second exemplary embodiment.

FIG. 8 illustrates one LED 13 in the configuration of FIG. 1, and a parallel circuit unit 12 corresponding to the LED 13, in which the parallel circuit unit 12 includes a bypass unit 20 and an abnormality detecting unit 30. The abnormality detecting unit 30 is constituted by a first circuit unit 30A and a second circuit unit 30B.

The bypass unit 20 has a configuration which is the same as that in FIG. 2. The first circuit unit 30A is the same as the abnormality detecting unit 30 in FIG. 2. That is, the configuration of FIG. 8 may be a configuration formed by adding a second circuit unit 30B and a peripheral circuit thereof to the configuration of FIG. 2.

A state signal SDa output by the first circuit unit 30A is a signal which is the same as the state signal SD in the first exemplary embodiment. Here, the state signal SDA is used as a detecting signal of a light-emitting side abnormality. That is, the state signal SDa may indicate that the light-emitting side is abnormal by the level H and that the light-emitting side is normal by the level L (see, e.g., FIGS. 3 and 4).

Hereinafter, a configuration in FIG. 8 which is different from that in FIG. 2 will be described.

The second circuit unit 30B includes PNP-type transistors Q3 and Q4, resistors R10 to R13, diodes D3 and D4, and a condenser C2.

The resistors R10, R11 and R12 are connected in series to a route of a sink current SY (a collector of the transistor Q2). In the transistor Q3, the base is connected to a connection point of the resistors R10 and R11, the emitter is connected to a connection point of the resistors R11 and R12, and the collector is grounded.

The anode of the diode D3 is connected to the terminal 24 to which a bypass control signal S1 of a bypass unit 20 is input, and the condenser C2 is connected between the cathode side and the ground. The connection point of the diode D3 and the condenser C2 is connected to the resistor R12 and the base of the transistor Q4. The emitter of the transistor Q4 is connected to a predetermined voltage Vcc line via the diode D4. The bias resistor R13 is connected between the base and the emitter of the transistor Q4. The collector output of the transistor Q4 becomes a state signal SDb' for detecting a bypass abnormality. In this case, the state signal SDb' indicates a bypass abnormality by the level H, and a normality by the level L.

The same configuration is employed in the plurality of parallel circuit units 12A to 12n, and a state signal SDb' output from each second circuit unit 30B is supplied to the connection point of the resistors R14 and R15 in a wired OR form. The output of a low pass filter by the condenser C3 is supplied to the control unit 11 as a state signal SDb. The state signal SDb becomes the level H when a bypass abnormality exists in at least one of the parallel circuit units 12A to 12n, and the state signal SDb becomes the level L when all of the parallel circuit units 12A to 12n are normal.

The operation of the second circuit unit 30B will be described.

In a period where the sink current SY flows (the ON period of the transistor Q2), the transistor Q3 is turned ON to discharge the condenser C2. The diode D3 is conductive when the bypass control signal S1 becomes the level H to charge the condenser C2. Accordingly, at a normal state, when the bypass control signal S1 becomes the level H and thus a turn-ON instruction is made, the sink current SY flows to discharge the condenser C2, while quick charging is performed at the diode D3 side of the condenser C2 so that the charged state of the condenser C2 is maintained. In a period where the bypass control signal S1 is in the level L and a turn-OFF instruction is made or in an L-level period in a dimming instruction, the sink current SY does not flow and the transistor Q3 is turned OFF. In addition, since the cathode side of the diode D3 is connected, there is no discharge route of the condenser C2. Also, in this case, the charged state of the condenser C2 is maintained. As described above, at the normal state, the charged state of the condenser C2 is maintained, and thus, the transistor Q4 is suppressed from being turned ON. When the transistor Q4 is turned OFF, the potential of the connection point of the resistors R14 and R15 becomes the level L, and the state signal SDb becomes the level L.

However, when a bypass route is not formed in the L-level period of the bypass control signal S1 due to a bypass abnormality, the sink current SY flows (see the waveform of the bypass abnormality in FIG. 4), and the balance is collapsed to discharge the condenser C2. Accordingly, the transistor Q4 is turned ON, and the collector current of the transistor Q4 is given to the resistor R14. Thus, the voltage appearing across the resistor R14 becomes the state signal SDb of the H level through the resistor R15 and the low pass filter of the condenser C3.

The condenser C2 is set to be quickly charged and slowly discharged. Accordingly, when a bypass abnormality occurs in a case where a bypass control signal S1 with high frequency pulses is given during a dimming instruction, that is, when a bypass route is not formed in the L-level period of the bypass control signal S1, the state signal SDb with the level H may be obtained.

According to the second exemplary embodiment as described above, the abnormality detecting unit 30 includes the first circuit unit 30A and the second circuit unit 30B. The first circuit unit 30A generates a first state signal SDa indicating a normal state or an abnormal state of the LED 13 side in a period where the bypass unit 20 is instructed to cut off the bypass route by the bypass control signal S1 (in a turn-ON instruction or dimming instruction period) during the supply of the emission driving current by the light source power supply 10. The second circuit unit 30B generates a second state signal SDb indicating a normal state or an abnormal state of the bypass unit 20, irrespective of the state of control by the bypass control signal S1 during the supply of the emission driving current by the light source power supply 10. By this configuration, the bypass abnormality may be always detected irrespective of the control state by the bypass control signal S1.

4. Modified Example

Although exemplary embodiments have been described above, various modified examples may be conceived based on the vehicular lamp of the present disclosure.

It may not be necessary to provide one parallel circuit unit 12 for only one LED 13. For example, one parallel circuit unit 12 may be provided for a group of serial or parallel LEDs.

The parallel circuit unit 12 may not be formed for all the LEDs 13. Especially, it is preferable that the parallel circuit unit 12 is provided for some LEDs 13 which may be turned OFF or dimmed during the supply of a current by the light source power supply 10.

Also, the present disclosure may also be applied to a case where other types of light emitting devices such as, for example, a filament bulb is used without being limited to a case where a semiconductor light emitting device such as, for example, an LED, is used.

In the above-described exemplary embodiments, descriptions has been made on an example in which the control unit 11 performs a control of stopping or reducing the supply of the emission driving current from the light source power supply 10, or a processing of making a notification to the ECU 4 when detecting an abnormality. However, the control unit 11 may perform an abnormality handling processing.

Also, in the cases of the light-emitting side abnormality and the bypass abnormality, the handling processing contents may be changed to each other.

The control unit 11 or the function of detecting a bypass abnormality by monitoring a state signal may be provided outside of the vehicular lamp 1 (for example, in a vehicle side microcomputer).

Although the exemplary embodiments have been described with reference to a vehicular headlight, the vehicular lamp of the present disclosure may be applied to, for example, a tail lamp, a daytime running lamp, a cornering lamp, a turn signal lamp, and a break lamp, besides the headlight. The technology of the present disclosure may also be applied to various lighting devices as non-vehicular lamps.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicular lamp comprising:
a plurality of light emitting devices connected in series;
a light source power supply configured to supply an emission driving current to the plurality of light emitting devices;
one or more bypass units connected in parallel to at least some of the light emitting devices to form a bypass route of the emission driving current so as to cause the light emitting devices to be in a turn-OFF state or to cut off the bypass route of the emission driving current so as to cause the light emitting devices to be in a turn-ON state according to a bypass control signal;
an abnormality detecting unit configured to generate a state signal indicating whether the one or more bypass units are in a normal state or in an abnormal state as well as whether the light emitting device side is in a normal state or in an abnormal state; and
a control unit configured to control the bypass route based on the state signal generated in the abnormal detecting unit such that the light emitting devices are either in the turn-OFF state or in the turn-ON state,
wherein when a signal indicating that the one or more bypass units are abnormal is generated as the state signal, supply of the emission driving current from the light source power supply is reduced or stopped.

2. The vehicular lamp of claim 1, wherein the state signal generated by the abnormality detecting unit indicates a normal state of the light emitting device side by a first logic level, and an abnormal state of the light emitting device side by a second logic level, in a period where the one or more bypass units are instructed to cut off the bypass route by the bypass control signal during the supply of the emission driving current by the light source power supply, and
the state signal indicates a normal state of the one or more bypass units by the second logic level and an abnormal state of the one or more bypass units by the first logic level, in a period where the one or more bypass units are instructed to form the bypass route by the bypass control signal during the supply of the emission driving current by the light source power supply.

3. The vehicular lamp of claim 1, wherein, when the supply of emission driving current by the light source power supply is initiated, a control of forming the bypass route is performed on each of the bypass units by the bypass control signal, and
during the control of forming the bypass route, when at least one state signal output from the abnormality detecting unit corresponding to each of the one or more bypass units continuously indicates an abnormal state of the one or more bypass units for a predetermined time, it is determined that the one or more bypass units are in the abnormal state.

4. The vehicular lamp of claim 2, wherein, when the supply of emission driving current by the light source power supply is initiated, a control of forming the bypass route is performed on each of the bypass units by the bypass control signal, and
during the control of forming the bypass route, when at least one state signal output from the abnormality detecting unit corresponding to each of the one or more bypass units continuously indicates an abnormal state of the one or more bypass units for a predetermined time, it is determined that the one or more bypass units are in the abnormal state.

5. The vehicular lamp of claim 1, wherein, during the supply of the emission driving current by the light source power supply, when a state signal output from an abnormality detecting unit corresponding to the one or more bypass units which perform the control of forming the bypass route by the bypass control signal continuously indicates an abnormal state of any of the one or more bypass units for a predetermined time, it is determined that the one or more bypass units are in the abnormal state.

6. The vehicular lamp of claim 2, wherein, during the supply of the emission driving current by the light source power supply, when a state signal output from an abnormality detecting unit corresponding to the one or more bypass units which perform the control of forming the bypass route by the bypass control signal continuously indicates an abnormal state of any of the one or more bypass units for a predetermined time, it is determined that the one or more bypass units are in the abnormal state.

7. The vehicular lamp of claim 3, wherein, during the supply of the emission driving current by the light source power supply, when a state signal output from an abnormality detecting unit corresponding to the one or more bypass units which perform the control of forming the bypass route by the bypass control signal continuously indicates an abnormal state of any of the one or more bypass units for a predetermined time, it is determined that the one or more bypass units are in the abnormal state.

8. The vehicular lamp of claim 4, wherein, during the supply of the emission driving current by the light source power supply, when a state signal output from an abnormality detecting unit corresponding to the one or more bypass units which perform the control of forming the bypass route by the bypass control signal continuously indicates an abnormal state of any of the one or more bypass units for a predetermined time, it is determined that the one or more bypass units are in the abnormal state.

9. The vehicular lamp of claim 1, wherein the abnormality detecting unit includes:
a first circuit unit configured to generate a first state signal indicating whether the light emitting device side is normal or abnormal in a period where at least the bypass units are instructed to cut off the bypass route by the bypass control signal during the supply of the emission driving current by the light source power supply; and
a second circuit unit configured to generate a second state signal indicating whether the bypass units are normal or abnormal irrespective of a control state by the bypass control signal during the supply of the emission driving current by the light source power supply.

10. The vehicular lamp of claim 1, wherein the control unit performs control processings of supplying the emission driving current by the light source power supply, outputting the bypass control signal to the one or more bypass units, and detecting the abnormal state of the one or more bypass units and the light emitting device side by monitoring the state signal, and
the control unit performs a control of reducing or stopping the supply of the emission driving current from light source power supply when the abnormal state of the bypass units or the light emitting device side is detected by the state signal.

11. The vehicular lamp of claim 2, wherein the control unit performs control processings of supplying the emission driving current by the light source power supply, outputting the bypass control signal to the one or more bypass units, and detecting the abnormal state of the one or more bypass units and the light emitting device side by monitoring the state signal, and
the control unit performs a control of reducing or stopping the supply of the emission driving current from light source power supply when the abnormal state of the bypass units or the light emitting device side is detected by the state signal.

12. The vehicular lamp of claim 3, wherein the control unit performs control processings of supplying the emission driving current by the light source power supply, outputting the bypass control signal to the one or more bypass units, and detecting the abnormal state of the one or more bypass units and the light emitting device side by monitoring the state signal, and
the control unit performs a control of reducing or stopping the supply of the emission driving current from light source power supply when the abnormal state of the bypass units or the light emitting device side is detected by the state signal.

13. The vehicular lamp of claim 4, wherein the control unit performs control processings of supplying the emission driving current by the light source power supply, outputting the bypass control signal to the one or more bypass units, and detecting the abnormal state of the one or more bypass units and the light emitting device side by monitoring the state signal, and
the control unit performs a control of reducing or stopping the supply of the emission driving current from light source power supply when the abnormal state of the bypass units or the light emitting device side is detected by the state signal.

14. The vehicular lamp of claim 5, wherein the control unit performs control processings of supplying the emission driving current by the light source power supply, outputting the bypass control signal to the one or more bypass units, and detecting the abnormal state of the one or more bypass units and the light emitting device side by monitoring the state signal, and
the control unit performs a control of reducing or stopping the supply of the emission driving current from light source power supply when the abnormal state of the bypass units or the light emitting device side is detected by the state signal.

15. The vehicular lamp of claim 6, wherein the control unit performs control processings of supplying the emission driving current by the light source power supply, outputting the bypass control signal to the one or more bypass units, and detecting the abnormal state of the one or more bypass units and the light emitting device side by monitoring the state signal, and
the control unit performs a control of reducing or stopping the supply of the emission driving current from light source power supply when the abnormal state of the bypass units or the light emitting device side is detected by the state signal.

16. The vehicular lamp of claim 7, wherein the control unit performs control processings of supplying the emission driving current by the light source power supply, outputting the bypass control signal to the one or more bypass units, and detecting the abnormal state of the one or more bypass units and the light emitting device side by monitoring the state signal, and the control unit performs a control of reducing or stopping the supply of the emission driving current from light source power supply when the abnormal state of the bypass units or the light emitting device side is detected by the state signal.

17. The vehicular lamp of claim 8, wherein the control unit performs control processings of supplying the emission driving current by the light source power supply, outputting the bypass control signal to the one or more bypass units, and detecting the abnormal state of the one or more bypass units and the light emitting device side by monitoring the state signal, and the control unit performs a control of reducing or stopping the supply of the emission driving current from light source power supply when the abnormal state of the bypass units or the light emitting device side is detected by the state signal.

18. The vehicular lamp of claim 9, wherein the control unit performs control processings of supplying the emission driving current by the light source power supply, outputting the bypass control signal to the one or more bypass units, and detecting the abnormal state of the one or more bypass units and the light emitting device side by monitoring the state signal, and the control unit performs a control of reducing or stopping the supply of the emission driving current from light source power supply when the abnormal state of the bypass units or the light emitting device side is detected by the state signal.

* * * * *